(12) United States Patent
Vautour

(10) Patent No.: US 8,336,923 B2
(45) Date of Patent: Dec. 25, 2012

(54) DRYER DUCT ELBOW

(75) Inventor: Mathieu Vautour, Richibucto (CA)

(73) Assignee: Imperial Sheet Metal, Ltd., Richibucto, NB ( * ) Notice: Subject to any disclaimer, the term of this patent is extended or adjusted under 35 U.S.C. 154(b) by 32 days.

(21) Appl. No.: 12/818,387

(22) Filed: Jun. 18, 2010

(65) Prior Publication Data

US 2011/0309612 A1 Dec. 22, 2011

(51) Int. Cl.
*F16L 43/02* (2006.01)

(52) U.S. Cl. .......................... 285/179; 285/183; 285/419

(58) Field of Classification Search .................. 285/183, 285/419, 179, 181, 373
See application file for complete search history.

(56) References Cited

U.S. PATENT DOCUMENTS

| | | | | |
|---|---|---|---|---|
| 777,552 A * | 12/1904 | Smith | | 285/182 |
| 854,713 A * | 5/1907 | Brown | | 285/148.19 |
| 3,153,546 A * | 10/1964 | Dunn | | 285/13 |
| 3,229,998 A * | 1/1966 | Pennington | | 285/419 |
| 4,374,596 A * | 2/1983 | Schlemmer et al. | | 285/305 |
| 4,405,161 A * | 9/1983 | Young et al. | | 285/80 |
| 4,735,444 A * | 4/1988 | Skipper | | 285/288.1 |
| 4,795,197 A * | 1/1989 | Kaminski et al. | | 285/12 |
| 4,822,080 A * | 4/1989 | Darish | | 285/179 |
| 4,893,846 A * | 1/1990 | McGraw | | 285/133.4 |
| 4,915,426 A * | 4/1990 | Skipper | | 285/288.1 |
| 5,022,685 A * | 6/1991 | Stiskin et al. | | 285/45 |
| 5,039,136 A * | 8/1991 | Snow | | 285/179 |
| 5,066,050 A * | 11/1991 | Kretchman | | 285/319 |
| 5,645,482 A | 7/1997 | Moss et al. | | |
| 6,098,312 A * | 8/2000 | Tuggle | | 34/607 |
| 6,230,418 B1 | 5/2001 | Gomulinski | | |
| 6,311,734 B1 * | 11/2001 | Petrovic | | 138/110 |
| 7,603,792 B1 * | 10/2009 | McDonald et al. | | 34/235 |

* cited by examiner

*Primary Examiner* — James Hewitt
(74) *Attorney, Agent, or Firm* — Pearl Cohen Zedek Latzer, LLP

(57) ABSTRACT

A dryer duct elbow for attachment between a dryer vent and flexible ducting, or between flexible ducting and a wall vent, may include a first larger end, containing threading and a groove containing an O-ring, and a second tapered end, having circumferential threading and a groove containing an O-ring. Either end is capable of rotational sealing engagement with the flexible ducting, or with frictional engagement with the dryer or wall vents. The dryer duct elbow is formed of two halves which are connected together at the edges to form one elbow.

5 Claims, 4 Drawing Sheets

DRYER DUCT ELBOW

FIELD F THE INVENTION

The invention relates generally to venting and specifically to a dryer duct elbow for attachment to a clothes dryer which is in turn connected to a ducting or a vent.

BACKGROUND OF THE INVENTION

Ducting for clothes dryers carries hot air from the dryer out of the building, and must do so safely and efficiently. Typical problems encountered with ducting is that the external air vent and the dryer are variable distances from one another, so the ducting must be able to accommodate varying configurations. Also, the ducting must be heat resistant, so that the hot dryer air does not melt the ducting, as well as any stray lint caught within the ducting does not cause a fire. The ducting must be of a low profile so that it fits behind the dryer, and rigid enough that it cannot be crushed by the dryer being pushed against the wall or during operation of the dryer.

One attempt at addressing these needs is U.S. Pat. No. 5,645,482, (Moss), which provides a rigid telescopically-extensible air duct connector made from sheet metal, one end of which fits within the dryer's duct port, and the other end of which attaches to the external air vent. This air duct connector is somewhat heat proof as a result of being made of metal, and narrow so that it fits behind the dryer, but it is limited in the range of connections that can be made. For instance, the extension cannot reduce to a smaller length than that of one of the telescopic sections, and it only works where axes of the dryer vent and the exterior vent are parallel.

Another attempt at a system for venting dryers is U.S. Pat. No. 6,230,418, which permits installation of a metal venting system assembled from low-profile ducts. Again, the same limitations as Moss are present here: the vent is limited in the range of connections that can be made, and only works where the axes of the dryer vent and the exterior vent are parallel.

Recently, flexible aluminum foil formed into a tube, with a shape that is held by coiled wire, has become the de facto standard for adapting a dryer vent to the exhaust vent. However, this foil duct is not rigid and is therefore prone to being crushed by the dryer when it is pushed against a wall or during operation of the dryer. If the vent is crushed or otherwise does not provide an easy path for the air, it may create backpressure reducing dryer efficiency or worse, may trap lint and risk causing a fire. Accordingly, there is a need for a device that holds the duct from being crushed while permitting the foil duct to extend unimpeded between the dryer vent and external vent.

SUMMARY OF THE INVENTION

An embodiment of the present invention discloses a dryer duct elbow for attachment between a dryer vent and flexible ducting, or between flexible ducting and a wall vent, which includes a first dryer connecting end, containing threading and a groove containing a rubber O-ring, and a tapered duct-connecting end, having circumferential threading and a groove containing an O-ring. Therefore either end is capable of rotational sealing engagement with the flexible ducting, or with frictional engagement with the dryer or wall vents. The dryer duct elbow is formed of two mirror-image halves which are connected together at the edges to form one elbow.

A duct elbow for a dryer vent may include a rigid tubular duct section, with a bend at the midpoint of the duct section; a dryer connecting end of the duct section, the inside surface of which has threading and has one or more grooves each adapted to receive an O-ring; and a duct connecting end of the duct section, the outside surface of which has threading and has one or more grooves each adapted to receive an O-ring. The duct section may include a first half having an inside edge of which has a lip and fastening means along its length and a second half having an inside edge of which has a recession and fastening means along its length. The first half and the second half may be assembled to form the duct section, the inside edge of the first half placed against the inside edge of the second half, and the lip within the recession, and the first half and the second half are fastened by the fastening means. The fastening means may include two or more pairs of tension flanges having a gap between each flange in a pair and a tab on the outside of each flange positioned on the first half; and two or more apertures corresponding in position to the pairs of tension flanges positioned on the second half. Each pair of tension flanges may be adapted to pass through the aperture, and the tabs may be adapted to engage the wall of the aperture to hold the first half and second half together. The diameter of the duct connecting end may taper away from the elbow. The bend may have an angle of between 45 and 135 degrees. The bend may have an angle of 90 degrees. The tubular duct may be a single piece. The tubular duct may be made of heat resistant plastic.

BRIEF DESCRIPTION OF THE DRAWINGS

It will now be convenient to describe the invention with particular reference to one embodiment of the present invention. It will be appreciated that the diagrams relate to one embodiment of the present invention only and are not to be taken as limiting the invention.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
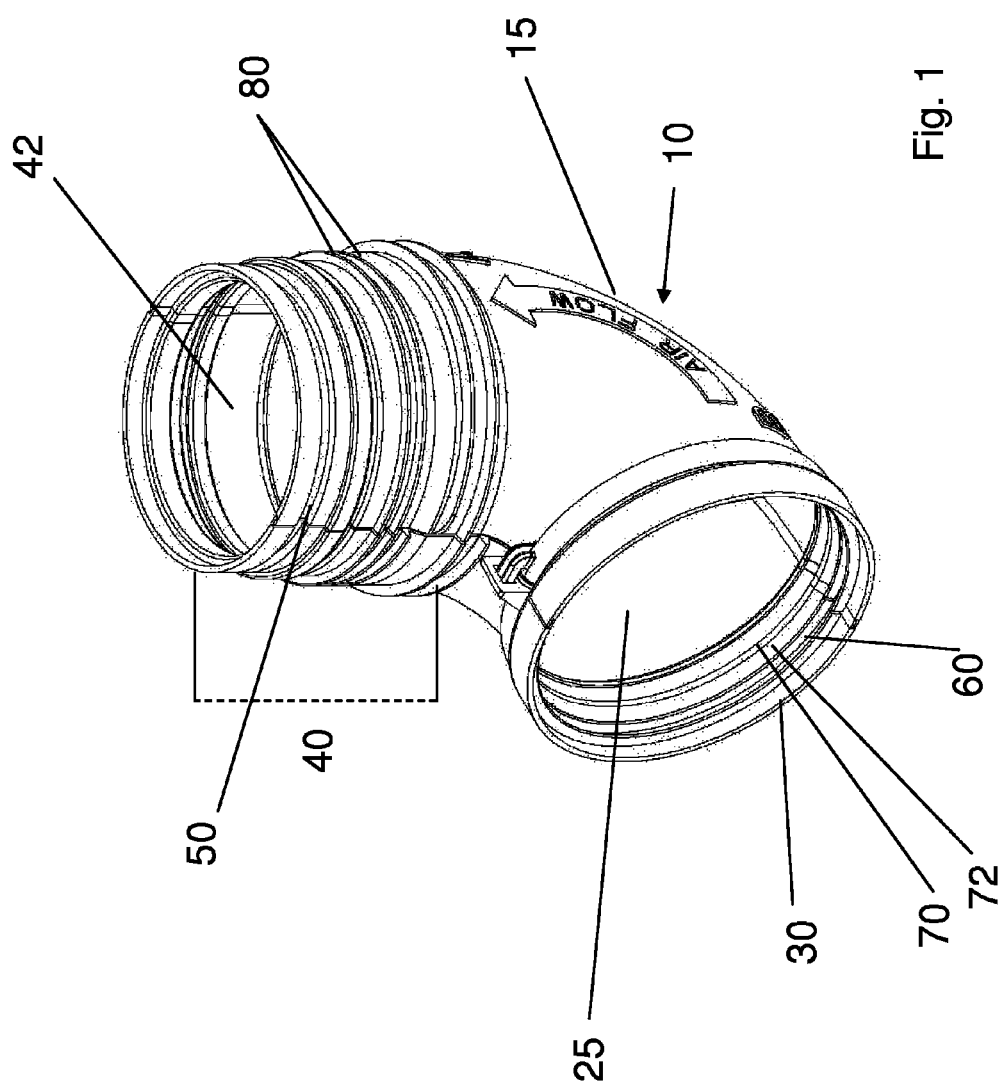
FIG. 1 is a perspective view of an uninstalled Quick Fit Elbow, according to one embodiment of the present invention.

With reference to FIG. 1 and according to one embodiment of the present invention, the assembled dryer duct elbow 10 is a tubular duct section formed into an approximately 90° bend at approximately the midpoint of the duct section. One skilled in the art would appreciate that the elbow bend may range from 45° to 135° to accommodate varying applications, without departing from the scope of the present invention. The elbow is intended to be attached between the dryer vent (not shown) from which the moist hot air emanates, and flexible duct (not shown), which carries the moist hot air to the external vent for expulsion from the building. The interior surface 25 of the elbow 10 is smooth, permitting unhindered laminar airflow from the dryer (not shown) to the flexible duct (not shown). The elbow 10 has a dryer connecting end 30, and a duct connecting end 40. The dryer connecting end 30 has a diameter slightly larger than that of the dryer vent, which is typically a standard size of 4 inches within the dryer manufacturing industry. In O-ring groove 60 there is positioned a rubber O-ring (not shown), made of a high-temperature rubber or plastic, which is of a slightly smaller diameter than, and frictionally engages the dryer vent (not shown). Threading 70 is molded into the plastic, and is of a diameter that the wire support of the flexible ducting fits within the lower portions 72 of the threading 70. As for the duct connecting end 40, the diameter of which tapers away from the elbow, there is a stop 42, to prevent the flexible duct from sliding further along the duct connecting end 40 than the stop 42. There is also another O-ring groove 50 within the duct connecting end 40 section, which contains an O-ring (not shown) made from a high-temperature rubber or plastic, and the duct connecting end 40 has threading 80 around its circumference as well. The diameter of the threading corresponds to the diameter of the flexible ducting. The duct connecting end 40, the diameter of which is approximately between 3¾" and 3⅞", in any event less than 4", tapers away from the elbow. This permits a flexible duct (not shown), with a slightly larger diameter (4" as a standard) than the duct connecting end 40, to be pushed or screwed over the duct connecting end 40 of the elbow and fit snugly. The threads 80, concentric around the axis of the duct and localized near the end, catch on the flexible foil duct (not shown) and hold it in place and prevents the foil duct from being easily removed once it is in place.

Figure 2:
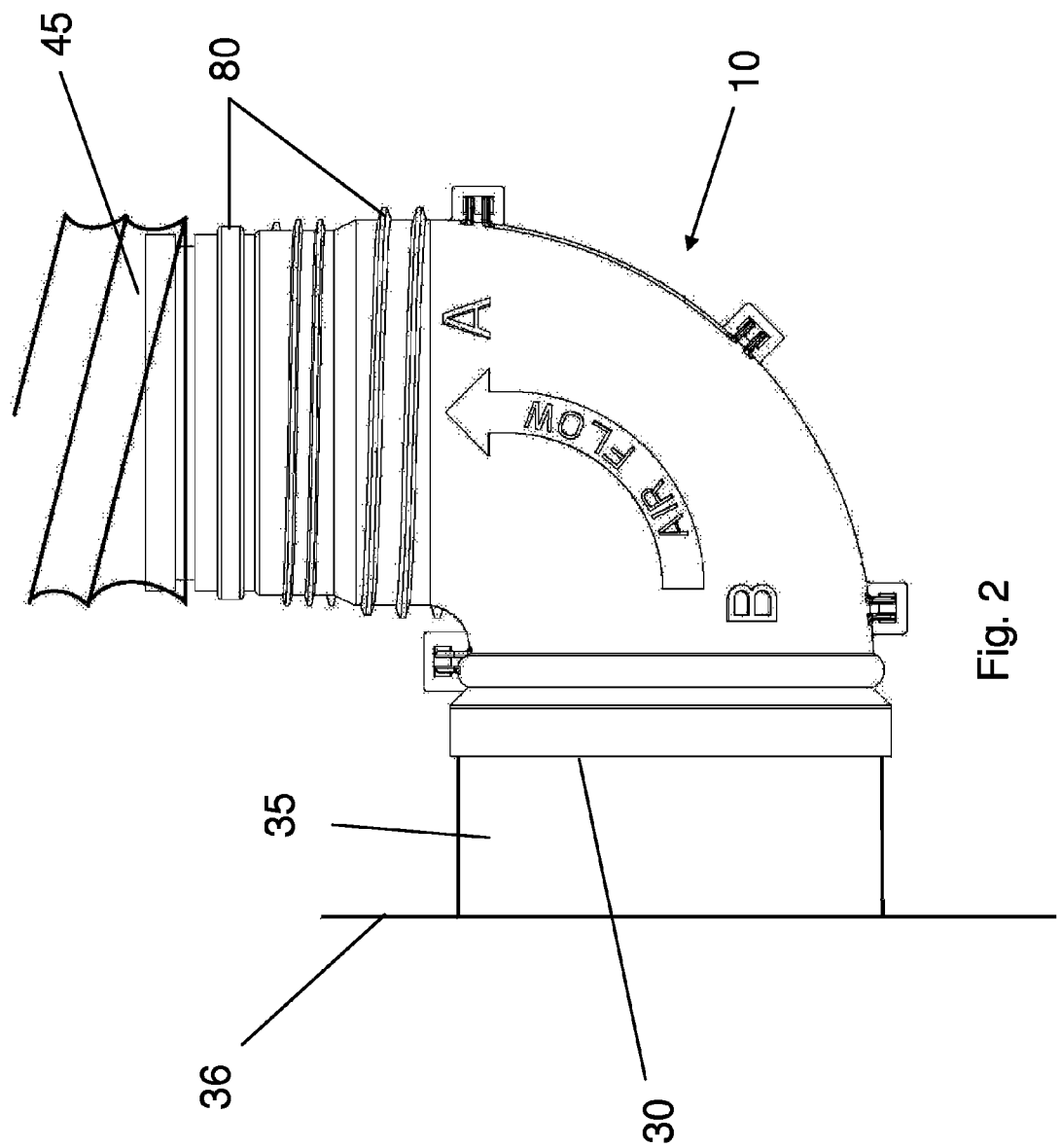
FIG. 2 is a side view of an installed Quick Fit Elbow, according to one embodiment of the present invention.

With reference to FIG. 2 and according to one embodiment of the present invention, the elbow 10 is intended to be assembled with the dryer connecting end 30 and gasket 70 around the dryer vent 35. The duct connecting end 40 and gasket 80 is intended to be connected with the flexible duct 45 as discussed above. The elbow 10 is rigid and protects the flexible duct 45 from being crushed as the dryer 36 is pushed towards the wall. It also permits a space to remain behind the dryer 36, which prevents the end of the flexible ducting connecting to the external vent from being crushed. As would be appreciated by one skilled in the art, the elbow 10 is preferably made of heat-resistant plastic, however may also be made of other materials not limited to metal, fiberglass and carbon fiber. In another embodiment, the elbow 10 may also be formed as one piece instead of two joined halves.

Figure 3:
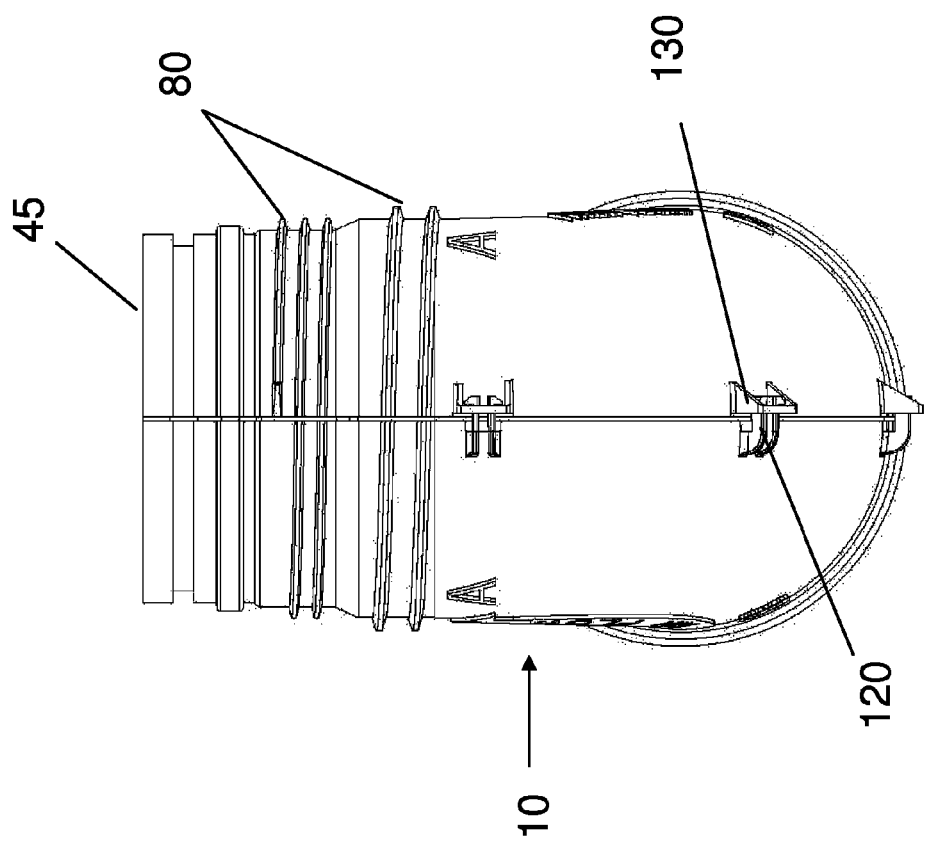
FIG. 3 is a back view of an uninstalled Quick Fit Elbow, according to one embodiment of the present invention.
Figure 4:
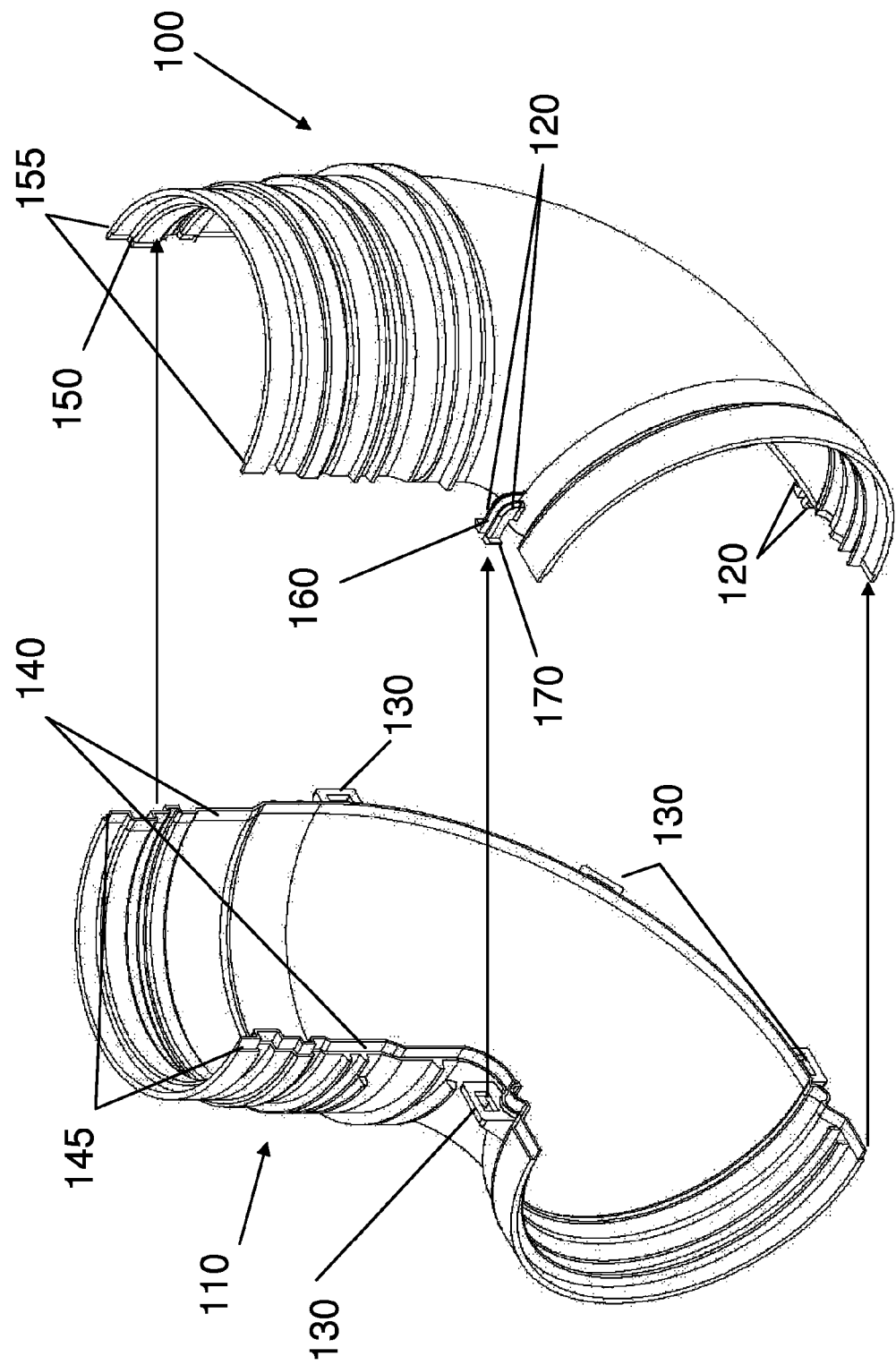
FIG. 4 is a disassembled view of a Quick Fit Elbow, according to one embodiment of the present invention

With reference to FIGS. 3 and 4, the elbow 10 is assembled by placing a first half 100 and a second half 110 of the 90° elbow together. These halves contain a substantially similar form on both sides, which are, in effect, minor images of each other. The elbow 10 is assembled by putting the corresponding first and second halves 100, 110 together to form a tubular section, using a fastening means to fasten said halves together. The first half 100 has a lip 140 on its inside edge 145 that traces the inside edge of the first half and fits within a corresponding recession 150 within the second half 110, which traces the inside edge 155 of the second half 110, to enable the halves to fit smoothly together. Where the lip 140 meets the recession 150, an airtight seal is formed between the edges 145, 155 of the two halves 100, 110. The first and second half 100, 110 are fastened together by fastening means. In the present embodiment, the fastening means consists of pairs of tension flanges 120 and apertures 130. On the first half 100, the edges of the half contain pairs of tension flanges 120 at four points, three on the outside of the elbow's bend, and one on the inside of the elbow's bend. Two tension flanges 120 forming each pair are pushed together, to narrow a gap 160 on the inside between the flanges and permit the now-compressed flanges 120 to pass through the corresponding female aperture 130. Once through the aperture 130, the tension flanges 120 are released and return to their previous width as a result of the resilience of the plastic of which the elbow is molded. On the outside of each tension flange 120 is a tab 170 which fits through the aperture 130 opening and catches behind the aperture 130 opening as the tension flanges 120 return to their previous width. The result of all four pairs of flanges 120 being placed through their corresponding apertures 130 and locking within the apertures 130 is that the two halves 100, 110 of the elbow 10 are releasably held together to form a complete elbow 10. The halves may be released from one another again simply by pushing each pair of flanges 120 together and through each aperture 130.

With reference to FIG. 1, and with regards to installation of the elbow, it may be installed between the dryer vent (not shown) and the flexible ducting (not shown), or between the flexible ducting (not shown) and the wall vent (not shown), or both. In the first configuration, the dryer vent typically has no threading and the dryer connecting end 30 is pushed on to the dryer vent. The O-ring (not shown) within the O-ring groove 60 frictionally engages the dryer vent. The flexible ducting may then be attached to the duct connecting end 40, by pushing or screwing the flexible duct over the tapered duct connecting end 40 such that the wire of the flexible duct engages the threads 80. In the second configuration, the flexible duct is screwed into the dryer connecting end 30, where the wire providing shape to the flexible ducting engages the threads 70. The duct connecting end 40 is then pushed into the wall vent (not shown), which typically has no threading, and engages the wall vent by frictional engagement with the O-ring (not shown) that is within O-ring groove 50. In summary, on the elbow there is therefore threading on both the dryer connecting end 30 and the duct connecting end 40, for rotational engagement with flexible ducting. Yet each end also has and O-ring (not shown) within O-ring grooves 50 and 60, for frictional engagement with ducting that has no threading, such as the dryer vent (not shown) and wall vent (not shown). The O-ring also forms a seal with the ducting with which it is engaged, due to its pliable nature. Therefore there is no need for tape, or caulking, for example, to seal the ducting to the elbow, and the elbow is able to sealingly engage with both flexible ducting and sheet metal ducting.

Many modifications and other embodiments of the invention will come to the mind of a person skilled in the art having the benefit of the teachings presented in the foregoing description and associated drawings. Therefore, it is understood that the invention is not to be limited to the specific embodiment disclosed, and that modifications and embodiments are intended to be included within the scope of the appended claims.

The invention claimed is:

1. A duct elbow for a dryer vent, comprising
   (i) a rigid tubular duct section, with a bend at the midpoint of said duct section;
   (ii) a dryer connecting end of said duct section, the inside surface of which has threading and has one or more grooves each adapted to receive an O-ring; and
   (iii) a duct connecting end of said duct section, the outside surface of which has threading and has one or more grooves each adapted to receive an O-ring;
   wherein said duct section further comprises:
   a. first half having an inside edge of which has a lip along its length and fastening means;
   b. a second half having an inside edge of which has a recession along its length and fastening means
      wherein said first half and said second half are assembled to form said duct section, the inside edge of said first half placed against said inside edge of said second half, and the lip within the recession, and said first half and said second half are fastened by the fastening means; and wherein said fastening means further comprises:
1. two or more pairs of tension flanges having a gap between each flange in a pair and a tab on the outside of each flange positioned on the first half; and
2. two or more apertures corresponding in position to said pairs of tension flanges positioned on the second half;

wherein each pair of tension flanges is adapted to pass through a respective said aperture, and the tabs are adapted to engage the wall of the aperture to hold said first half and second half together.

2. The duct elbow of claim 1 wherein the diameter of said duct connecting end tapers away from the elbow.

3. The duct elbow of claim 1 wherein the bend has an angle of between 45 and 135 degrees.

4. The duct elbow of claim 1 wherein the bend has an angle of 90 degrees.

5. The duct elbow of claim 1 wherein the tubular duct section is made of heat resistant plastic.

* * * * *